US008425993B2

(12) United States Patent
Knight et al.

(10) Patent No.: US 8,425,993 B2
(45) Date of Patent: Apr. 23, 2013

(54) PRINT MEDIA AND METHODS FOR MAKING THE SAME

(75) Inventors: Douglas E Knight, San Diego, CA (US); Matthew D. Giere, San Diego, CA (US); Bor-Jiunn Niu, San Diego, CA (US); Betty Coulman, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1628 days.

(21) Appl. No.: 11/538,257

(22) Filed: Oct. 3, 2006

(65) Prior Publication Data

US 2008/0081203 A1 Apr. 3, 2008

(51) Int. Cl.
*B32B 27/06* (2006.01)
*B32B 9/00* (2006.01)

(52) U.S. Cl.
USPC ....... 428/32.16; 428/68; 428/195.1; 428/196; 428/343; 428/542.2; 428/480; 428/522; 442/59

(58) Field of Classification Search ........................ None
See application file for complete search history.

(56) References Cited

U.S. PATENT DOCUMENTS

| | | | | | |
|---|---|---|---|---|---|
| 5,679,451 | A | * | 10/1997 | Kondo et al. | 428/32.32 |
| 5,695,820 | A | * | 12/1997 | Davis et al. | 427/261 |
| 6,207,258 | B1 | | 3/2001 | Varnell | |
| 6,251,214 | B1 | * | 6/2001 | Ritchie | 156/327 |
| 6,838,132 | B1 | * | 1/2005 | Iguchi et al. | 428/32.16 |
| 2001/0016249 | A1 | * | 8/2001 | Kitamura et al. | 428/195 |
| 2003/0227531 | A1 | | 12/2003 | Hosoi et al. | |
| 2004/0096598 | A1 | | 5/2004 | Kasamatsu et al. | |
| 2006/0001725 | A1 | * | 1/2006 | Nagata et al. | 347/105 |

FOREIGN PATENT DOCUMENTS

| | | | | |
|---|---|---|---|---|
| EP | 0 943 450 | A | | 9/1999 |
| EP | 943450 | A2 | * | 9/1999 |
| EP | 1 122 084 | A | | 8/2001 |
| EP | 1 629 987 | A | | 3/2006 |
| GB | 2 147 003 | A | | 5/1985 |

* cited by examiner

*Primary Examiner* — David Sample

(57) ABSTRACT

The present invention is directed to a medium ("substrate") usable with inkjet printing apparatus (either or both piezoelectric and thermal inkjet, or other forms of inkjet printing), and methods for forming and using the same. In one embodiment, the substrate comprises a base material component and an image enhancing layer including a metallic salt disposed either or both on at least one side of the base medium and mixed within the base medium thereon. The present invention is further directed to printable articles including the same.

32 Claims, 4 Drawing Sheets

PRINT MEDIA AND METHODS FOR MAKING THE SAME

FIELD OF THE INVENTION

This invention relates to printing media and methods for making and using the same, and in particular, to print media for use in inkjet printing.

RELATED APPLICATIONS

This application is related to published patent application No. 20050217815A1, entitled "Print Media and Methods of Making Print Media" filed on Apr. 2, 2004, and assigned the same assignee as that of the present invention, the content of which is incorporated herein by reference in its entirety.

BACKGROUND OF THE INVENTION

The use of digital image-forming apparatus such as, thermal inkjet printers, piezo-electric printers, desktop printers, large format printers, and laser printers, has grown in recent years. The growth may be attributed to substantial improvements in print resolution and overall print quality coupled with appreciable reduction in cost, and ease of use. Today's image-forming apparatus offer acceptable print quality for many commercial business and household applications at costs lower than those offered in the past.

Media products (e.g., paper and fabric such as canvas) for receiving printed images are used in conjunction with these image-forming apparatus. For example, known imaging and printing media often include a base paper, coated with a single or multi-layer functional coating, such as ink receiving layer, curl balancing layer, and optionally image protection layer. In the case of paper, the base paper can be either uncoated raw base paper, coated base paper, or resin coated photo base paper. As can be appreciated the various and multitude of steps have to be balanced with the need for high quality imaging at an economically competitive and attractive cost.

Thus, there is a keen demand for media, that meet high quality standards with respect to brightness, opacity, and dry and/or wet strength, as well as providing water-resistant and vivid printed images, as printed with any of a wide range of colorants.

SUMMARY

The present invention is directed to printable articles comprising a medium ("substrate") usable with inkjet printing apparatus (either or both piezoelectric and thermal inkjet, or other forms of inkjet printing), and methods for forming and using the same. In one embodiment, the substrate comprises a base material component and an image enhancing layer including a metallic salt disposed either or both on at least one side of the base medium and mixed within the base medium thereon. The present invention is further directed to printable articles including the same.

DETAILED DESCRIPTION OF EMBODIMENTS OF THE INVENTION

Figure 1A:
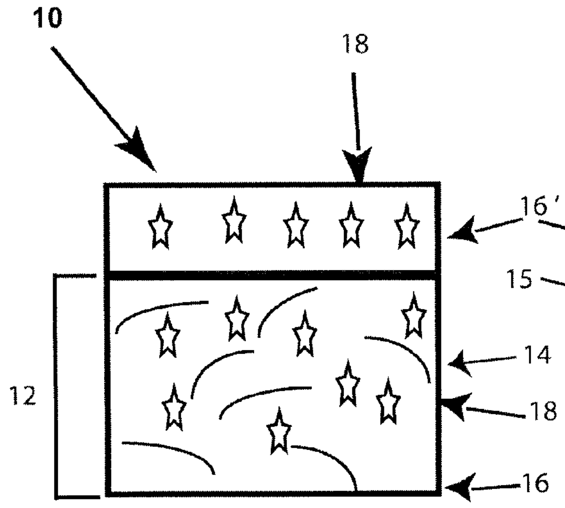
FIGS. 1*a* and 1*b* illustrate representative embodiments of a substrate embodying features of the present invention.

The present invention is directed to printable articles comprising a medium ("substrate") usable in inkjet printing apparatus (either or both piezoelectric and thermal inkjet, or other forms of inkjet printing). In one embodiment, the substrate comprises a base medium and an image enhancing material which is present either or both as a layer disposed adjacent to the base medium and within the material from which the base medium is formed. According to an embodiment, the base medium is, but not limited to, porous media including cotton bond, canvas, rice paper; and fiberglass. In an embodiment, the substrate is formed from woven material formed from fibrous materials, such as cellulose or glass containing fibers, examples of which include canvas material and fiberglass. As used herein, woven refers to a medium formed, at least in part, from interlaced strands or fibers.

According to an embodiment, the substrate includes a backing layer disposed adjacent the base medium and opposite the at least one image enhancing layer (or the printing side). In an embodiment, the backing layer is further layered with a release liner, such as a silicone coated release liner.

In an embodiment, the substrate is a "printed substrate" that is at least partially covered with an image formed by way of for example inkjet ink. The present invention is further directed to methods of manufacture of the substrate, as well as "inkjet printing systems," including either or both printer and "inkjet pens," for use with, or with which, such substrate is usable. The substrates of the present invention provide for enhanced print performance including image quality and durability (e.g., water-fastness).

The substrate may be used to print images (i.e., creating "printed substrate") thereon using commercially available inkjet printers from a number of manufacturers. The inkjet printers include, by way of example, piezo and thermal inkjet printers, both desk top and large format. Examples include Deskjet®, Business Inkjet, Photosmart® Inkjet, and Designjet® printers, all manufactured by Hewlett-Packard Company of Delaware.

As used in this specification and in the appended claims, the following terms have the following meanings:

Any of the terms "substrate," "print substrate," "print media," "print medium," and base material is meant to encompass a substrate based on cellulosic fibers (e.g., canvas), synthetic fibers (e.g., polyamides, polyesters, polyethylene, and polyacrylic fibers), inorganic fibers (e.g., asbestos, ceramic, and glass fibers such as fiberglass), extruded plastics (e.g. vinyl, polyester and polyvinylchloride (PVC)), and any combination of thereof. The substrate may be of any dimension (e.g., size or thickness) or form (e.g., pulp, wet paper, dry paper, etc.). The substrate is preferably in the form of a flat sheet, or roll structure, which structure may be of variable dimensions (e.g., size and thickness). The term "sheet" or "flat structure" is not meant to be limiting as to dimension, roughness, or configuration of the substrate, but rather is meant to refer to a product suitable for printing. The term 'layer' as used herein includes either or both one or more thicknesses, courses, or folds laid or lying over or under another ("Composite Structure"); and a material impregnating another.

As used herein, "image quality" refers to the fullness, intensity, clarity, and overall image characteristics of an inkjet ink after application to the print medium (thus forming the printed substrate). These visual effects are generally a measure of the concentration of ink at a given point on the printed substrate, the presence or absence of unwanted bleeding of one color into another.

The terms "waterfast" and "dripfast" are used herein to describe a form of water resistance which is normally used to refer to the nature of the ink composition after drying on the substrate. In general, waterfast and dripfast mean that the dried composition is substantially insoluble in water, such that upon contact with water, the dried ink retains at least about 70%, preferably at least about 85%, and more preferably at least about 95%, of optical density. In particular, waterfast generally refers to the waterfastness characteristics of the printed medium after full immersion of the medium in water, while dripfast refers to its performance after droplets of water have been applied, in a drip fashion, onto the media.

As used herein, "porosity" refers to the amount of ink that the coating can absorb during the printing process. In general, inkjet receiving layers consist of swellable or porous coating technologies. Porosity has a particular effect on image quality when porous coating technology is applied into the inkjet receiving layer. For example, a high porosity coating can create good image quality in canvas media, however, the cracking of high porosity coatings is problematic when stretching the printed canvas around a frame. On the other hand, a low porosity coating improves cracking, but yields poor image quality due to the bleed that occurs during printing. In the present invention, a metallic salt is applied on the surface of the inkjet receiving layer with low porosity coating, yielding excellent image quality while maintaining good cracking performance. Porosity may be measured using a pore size analyzer from Autosorb-1 made by Quantachrome, Boynton Beach, Fla. (USA).

As used herein, the term "printable article" refers to article comprising the substrate or a product comprising the substrate (as for example described below as a surfboard product).

In an embodiment, the image enhancing material includes at least one cationic compound including but not limited to metallic salts such as inorganic cationic species and/or salts thereof.

Suitable examples of metallic salts (e.g., reference element 18 in FIG. 1) include mono- or multi-valent metallic salts. The metallic salts are soluble in water. The metallic salt can include cations such as, but not limited to, Group I metals, Group II metals, Group III metals, or the transition metals. In particular, the metallic cation can include, but is not limited to, sodium, calcium, copper, nickel, magnesium, zinc, barium, iron, aluminum and chromium ions. In an embodiment, the metallic cation includes calcium, magnesium, and aluminum. The anion species can include, but is not limited to, chloride, iodide, bromide, nitrate, sulfate, sulfite, phosphate, chlorate, acetate ions, and combinations thereof.

Exemplary embodiments of the metallic salt includes, but is not limited to, sodium chloride, aluminum chloride, aluminum bromide, aluminum sulfate, aluminum nitrate, aluminum acetate, barium chloride, barium bromide, barium iodide, barium nitrate, calcium chloride, calcium bromide, calcium iodide, calcium nitrate, calcium acetate, copper chloride, copper bromide, copper sulfate, copper nitrate, copper acetate, iron chloride, iron bromide, iron iodide, iron sulfate, iron nitrate, magnesium chloride, magnesium bromide, magnesium iodide, magnesium sulfate, magnesium nitrate, magnesium acetate, nickel chloride, nickel bromide, nickel sulfate, nickel nitrate, nickel acetate, zinc chloride, zinc bromide, zinc sulfate, zinc nitrate, zinc acetate; or combinations thereof. In an embodiment, the metallic salt includes sodium chloride, aluminum chloride, calcium chloride, calcium nitrate, magnesium chloride; or combinations thereof.

The image enhancing material is present in an amount yielding a coating weight of about 0.01 to about 10 $g/m^2$, often from about 0.1 to about 5 $mg/m^2$, and usually from about 1 to about 5 $g/m^2$.

The treatment of the base medium may result in the presence of the image enhancing material either or both as an image enhancing layer disposed adjacent the base medium and within the porous or fibrous material of the base medium when a porous material is used (e.g., cotton, canvas, fiberglass).

In an embodiment, a base medium with an image enhancing layer is printed and then further coated with a resin or lacquer, atop the image enhancing layer. In an embodiment, the resin coating is selected to be compatible with the base medium and other components of the substrate, such that upon its disposing, may include subsequent curing thereof, such that it encapsulates the printed article and is, at least substantially, transparent. Examples of suitable resins include polyurethanes, polyesters, epoxies, and combinations thereof. Examples of typical base medium include fiberglass, rice paper, cloth, canvas, or cotton bond paper.

The substrate may include other components such as, but not limited to, binders, starch, optical brighteners, inorganic or organic filler, sizing agents, anionic reagents, and combinations thereof.

Figure 1B:
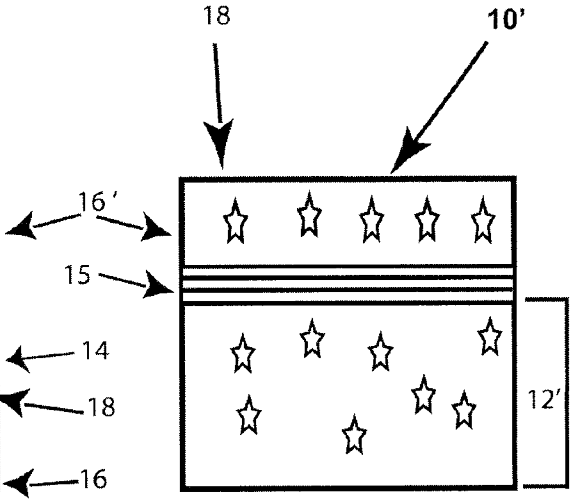

Now referring to FIGS. 1*a* and 1*b*, cross-sectional views of representative media 10 and 10' having been treated with an image enhancing material and embodying features of the invention are shown. The medium 10 may include, but is not limited to, a base medium 12, which as shown includes a fibrous component 14 (or 12' in FIG. 1*b* which does not include the fibrous component), an image enhancing layer 16 and/or 16' either of which includes a metallic salt 18. It should be appreciated that although a fibrous containing base material is shown, the base medium may be formed from non-fibrous material such as vinyl or a non-porous inkjet receiving layer as those traditionally employed in inkjet media, as for example shown in FIG. 1*b*. As mentioned above, the image enhancing material may be present as a layer 16' disposed adjacent at least one surface of the base medium 12 as an image enhancing layer 16', and/or disposed within and among the fibrous component 14. Further, the base medium 12 may include additional components such as, but not limited to, binders, fillers, and the like (not shown for clarity). It should be appreciated that although the present invention enables enhanced image quality on substrate which may not have been treated with other image enhancing layers, such as inkjet receiving layers traditionally employed, the present invention may also effectively be used with such treated medium, as shown in FIG. 1*b*. Medium 10' is similar to media 10 as shown in FIG. 1*a*, and further including an inkjet receiving layer 15 disposed between the image enhancing layer 16' and the base medium 12. The inkjet receiving layer 15 may be formed from inkjet receiving material as those traditionally employed in inkjet media.

Figure 2:
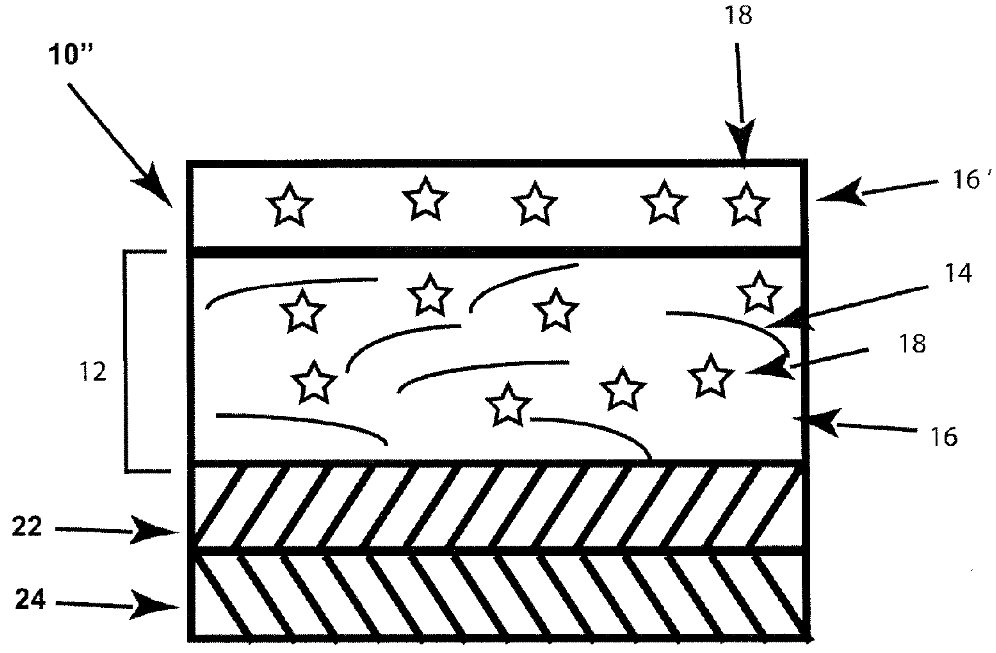
FIG. 2 illustrates an embodiment of a print medium embodying features of the present invention.

In an embodiment, features of which are shown in FIG. 2, a back-coating 22, and a release liner 24 are disposed adjacent the base medium 12 which faces away from the image enhancing layer 16' (or in the case of image enhancing medium 16, facing away from the printing side of the print medium. In an embodiment, preferably the coating 22 is a resin soluble adhesive layer. The solubility of the adhesive in the resin is desirable so as not to inhibit bonding of the total composite to the base paper. The liner layer 24, is preferably a silicone coated release layer. In an embodiment, the addition of adhesive and the liner provide improvements in the application process (e.g., substrate may be fixed prior to downstream process steps) while also increasing stiffness of the substrate to allow for high reliability in digital printers.

Figure 3A:
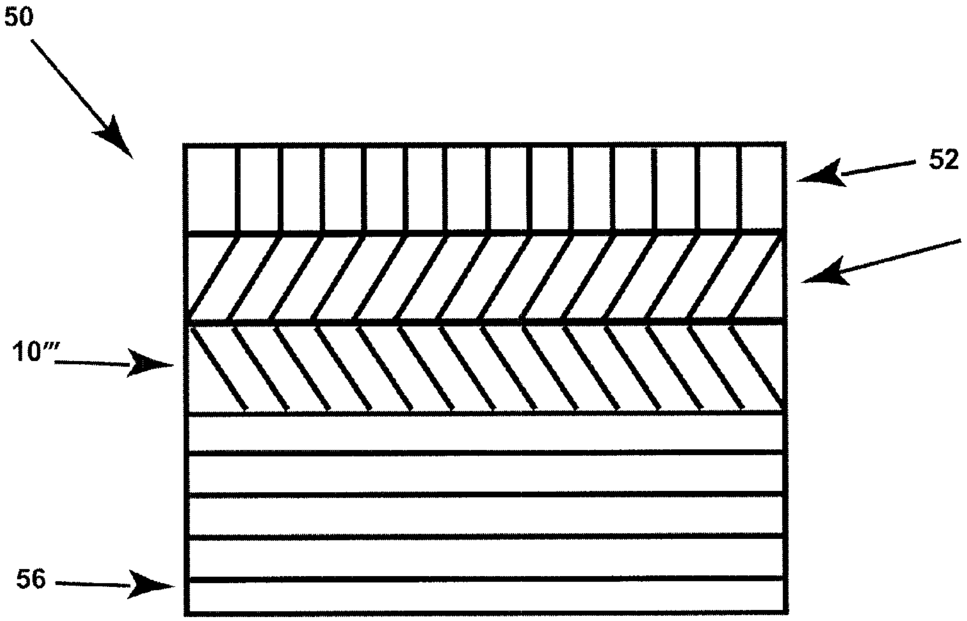
FIGS. 3*a* and 3*b* illustrate an embodiment of a print medium embodying features of the present invention.
Figure 3B:
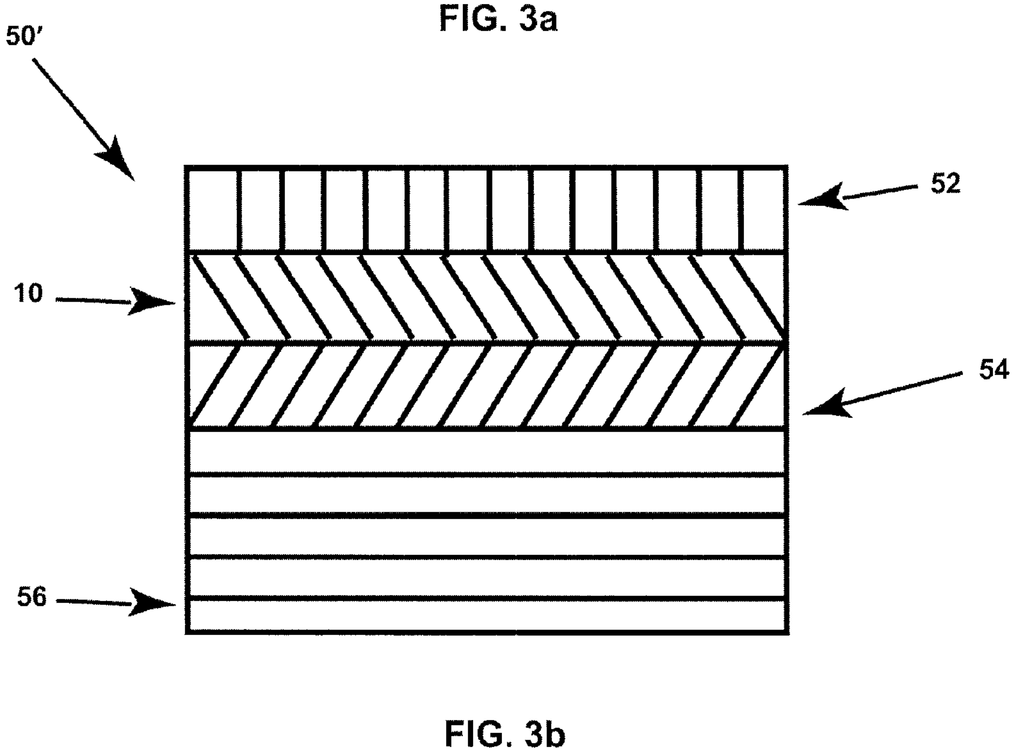

Now referring to FIGS. 3*a* and 3*b*, exemplary fiberglass-containing medium such as surfboard 50 and 50' and embodying features of the invention are shown. The surfboard 50 includes a resin coating 52 as the top layer; a fiberglass layer 54 disposed underneath the resin layer 52; a printed substrate 10" with graphics, images, and/or text thereon and which is formed from substrate 10'" embodying features of the present invention; and a foam core 56. By way of illustration, the substrate 10'" is printed thereon using printing technology such as laser-jet or ink-jet. As indicated above, the substrate 10 may include a resin-soluble back coating 22 and/or the release liner 24 (as for example shown in FIG. 2). The substrate 10'" is thereafter applied onto the foam core 56 followed by applying the resin coating 52 thereon. Now referring to FIG. 3*b*, in an embodiment, the fiberglass layer 54 is first disposed on the foam core 56, followed by disposing a printed substrate 10' (or non-printed to be printed thereon after being disposed), followed by applying the resin layer 52.

Figure 4:
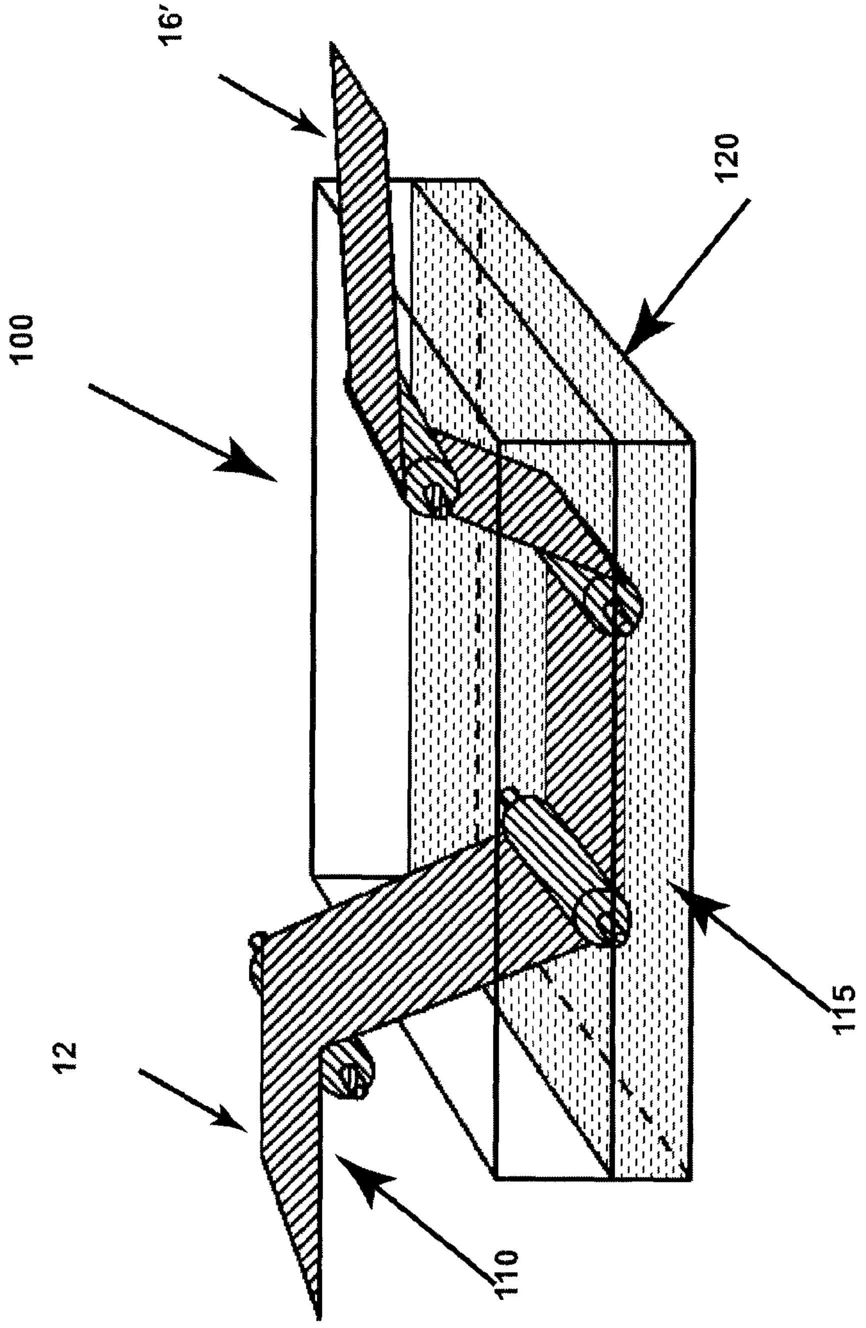
FIG. 4 illustrates a representative process for making a substrate embodying features of the present invention.

Now referring to FIG. 4, an exemplary process 100 for making the substrate 10 of the present invention embodying features of the present invention is illustrated. The process as shown includes immersing a roll 110 of the base material 12 in a tank 115 containing image enhancing material such as cationic species 120. The process 100 results in the formation of primarily an image enhancing layer 16' and/or 16.

EXAMPLES

In an effort to further assess the improvements obtained as a result of the practice of features of the present invention, different examples were prepared.

Example 1

In one series of examples, different types of base medium were treated with the image enhancing material 18, such as $CaCl_2$. In one example, a 0.1% by weight of $CaCl_2$ aqueous solution was spray coated on the base media to yield a coating weight of about 0.1 to about 0.5 g/m$^2$.

The samples were evaluated for general image quality, "IQ," by visually evaluating the samples for attributes such as color density and unwanted bleed as well as measured quantitatively for bleed performance. The results are represented in TABLE I below:

TABLE I

| Bleed (the distance the darker color bled into lighter color as measured in mm & IQ Score) | | |
|---|---|---|
| Base medium | Treated sample | Control |
| | fiberglass | |
| Bleed | 0 mm | 0.49 mm |
| IQ score*[1] | 8 | 3 |
| | canvas | |
| Bleed | 0 mm | 2.1 mm |
| IQ score | 9 | 1 |
| | rice paper | |
| Bleed | 0 mm | 0.37 mm |
| IQ score | 8 | 1 |

*[1]IQ score: it is a visual evaluation for the total image performance quality of the sample, ranging from 1 to 10, with 10 being the best.

Example 2

Figure 5:
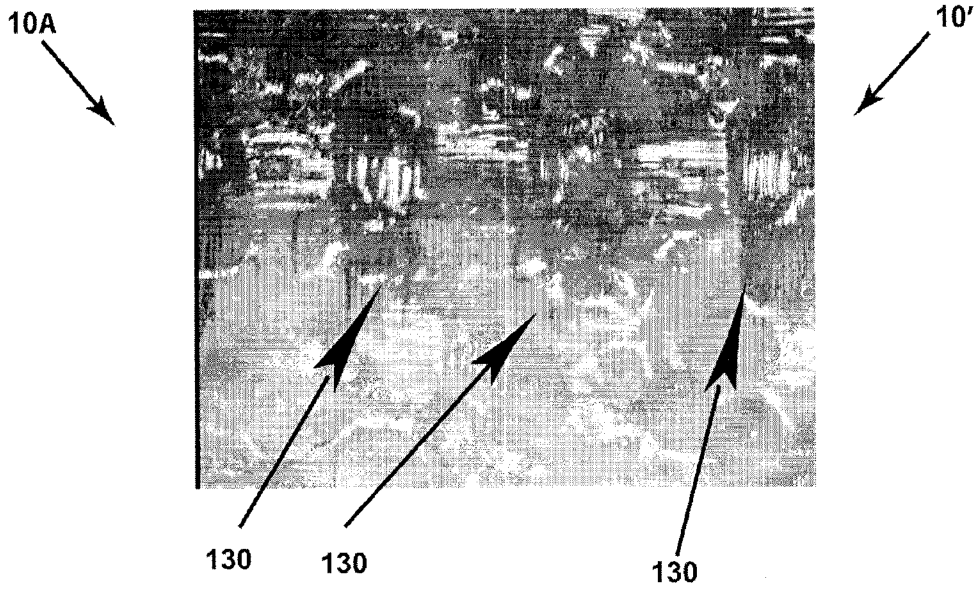
FIG. 5 is a pictorial representation of the image quality of a substrate not including an image enhancing layer according to the present invention.
Figure 6:
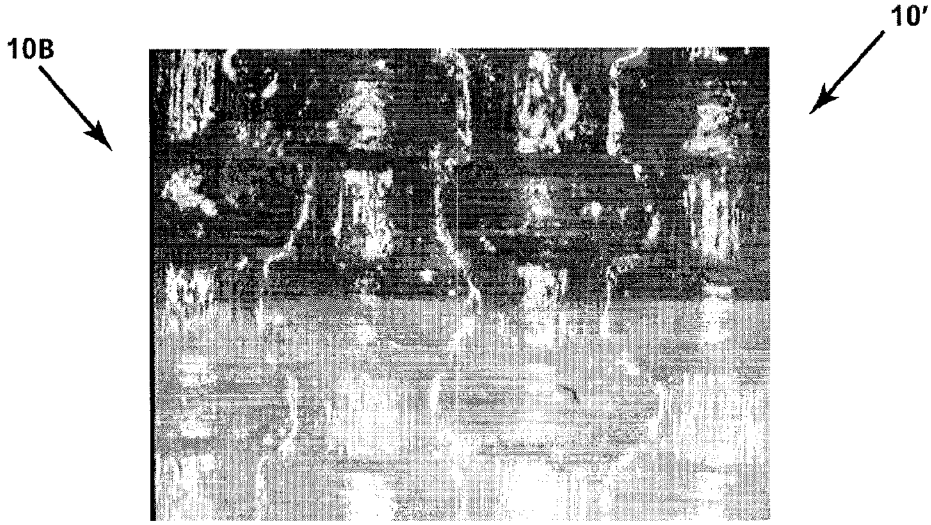
FIG. 6 is a pictorial representation of the image quality of a printed substrate embodying features of the present invention.

In another series of experiments, a treated fiberglass-based surfboard was prepared to yield the embodiment described in reference to FIG. 3*a*. First, fiberglass samples were treated with a layer of $CaCl_2$. Samples of the treated fiberglass such as 10' were then printed and disposed on the core medium 56 (here a foam core as used in a fiberglass-based surfboard material). A control sample 10A was also prepared without the $CaCl_2$ layer. The samples were evaluated visually for unwanted bleeding 130 of one color into another; the results of which are shown pictorially in FIGS. 5 and 6, respectively for 10A and 10B. As can be noted, the treated sample, 10B, shown in FIG. 6 shows little or no unwanted bleed. After printing, the treated fiberglass was placed on a standard surfboard foam support and then impregnated with a polyester based resin. Several other supports such as plywood, plastic, and metal can be used to create a wide range of highly durable printed articles.

While particular forms of the invention have been illustrated and described herein, it will be apparent that various modifications and improvements can be made to the invention. Moreover, individual features of embodiments of the invention may be shown in some drawings and not in others, but those skilled in the art will recognize that individual features of one embodiment of the invention can be combined with any or all the features of another embodiment. Accordingly, it is not intended that the invention be limited to the specific embodiments illustrated. It is intended that this invention to be defined by the scope of the appended claims as broadly as the prior art will permit.

What is claimed is:

1. A printable article comprising a substrate consisting essentially of a base material and an image enhancing material consisting essentially of at least one multivalent salt or a combination of at least one multivalent salt and at least one monovalent salt;

wherein said substrate has an image receiving side and an opposite side;

wherein said image enhancing material is disposed on said base material or integrated into said base material;

wherein at least a portion of said base material comprises a woven-fibrous material; and wherein the image enhancing material is disposed within at least a portion of the woven-fibrous component of the base material.

2. The printable article of claim 1, wherein the woven-fibrous material is selected from the group consisting of cotton, rice paper, canvas, fiberglass, and combinations thereof.

3. The printable article of claim 2 further comprising
a printed image on the image receiving side of the substrate; and
a resin encapsulating the printed image.

4. The printable article of claim 2 further comprising
a printed image on the image receiving side of the substrate; and
a resin impregnating the printed image.

5. The printable article of claim 4, wherein the resin is formed from a material selected from the group consisting of polyurethanes, polyesters, epoxies, and combinations thereof.

6. The printable article of claim 2 further comprising a foam core disposed on the opposite side of the substrate.

7. The printable article of claim 2 further comprising a resin disposed on the image receiving side of the substrate.

8. The printable article of claim 7 wherein the resin is formed from a material selected from the group consisting of polyurethanes, polyesters, epoxies, and combinations thereof.

9. The printable article of claim 1 further comprising fiberglass material disposed on the opposite side of the substrate.

10. The printable article of claim 1, wherein the base material is formed from a woven material.

11. The printable article of claim 10, wherein the woven material is formed from a canvas material.

12. The printable article of claim 1 further comprising an adhesive layer disposed on the opposite side of the substrate.

13. The printable article of claim 1 further comprising
a printed image on the image receiving side of the substrate; and
a fiberglass material disposed on either side of the substrate.

14. The printable article of claim 13 further comprising a resin material encapsulating the substrate.

15. The printable article of claim 13 further comprising a resin material impregnating the substrate.

16. The printable article of claim 1 further comprising
a printed image on the image receiving side of the substrate; and
a resin impregnating the printed image.

17. The printable article of claim 1, wherein the image enhancing material consists of sodium chloride salt.

18. The printable article of claim 1, wherein the image enhancing material consists of at least one multivalent salt selected from the group consisting of salts of Group II metals, salts of Group III metals, and combinations thereof.

19. The printable article of claim 1, wherein the image enhancing material consists of at least one multivalent salt selected from the group consisting of aluminum chloride salt, calcium chloride salt, calcium nitrate salt, magnesium chloride salt, and combinations thereof.

20. The printable article of claim 1, wherein the image enhancing material is present in an amount ranging from about 0.1 to about 5.0 grams per square meter ($g/m^2$ or GSM) of the substrate.

21. The printable article of claim 1, wherein the image enhancing material consists of $CaCl_2$.

22. A printed article, comprising:
a substrate consisting essentially of a base material and an image enhancing material consisting essentially of at least one multivalent salt or a combination of at least one multivalent salt and at least one monovalent salt;
wherein said substrate has an image receiving side and an opposite side;
wherein said imaging enhancing material is disposed on said base material or integrated into said base material; and
wherein the substrate is printed on the image receiving side and is further impregnated or encapsulated with a resin material.

23. The printed article of claim 22, wherein the base material includes a fibrous material.

24. The printed article of claim 23,
wherein the fibrous material is selected from the group consisting of cotton, rice paper, canvas, fiberglass, and combinations thereof.

25. The printed article of claim 22 further comprising a support member disposed on the opposite side of the substrate.

26. The printed article of claim 25, wherein the support member is selected from the group consisting of plywood, plastic, metal, and foam.

27. A printed article comprising:
a substrate consisting essentially of a base material and an image enhancing material consisting essentially of at least one multivalent salt or a combination of at least one multivalent salt and at least one monovalent salt;
wherein said substrate has an image receiving side and an opposite side;
wherein said imaging enhancing material is disposed on said base material or integrated into said base material; and
wherein the substrate is printed on the image receiving side and is further impregnated or encapsulated with a fiberglass material.

28. The printed article of claim 27, wherein the base material includes a fibrous material.

29. The printed article of claim 28, wherein the fibrous material is selected from the group consisting of cotton, rice paper, canvas, fiberglass, and combinations thereof.

30. The printed article of claim 27 further comprising a resin material impregnating or encapsulating the printed article.

31. The printed article of claim 27 further comprising a support member disposed on the opposite side of the substrate.

32. The printed article of claim 31, wherein the support member is selected from the group consisting of plywood, plastic, metal, and foam.

* * * * *